US012737779B2

(12) United States Patent
Karri et al.

(10) Patent No.: US 12,737,779 B2
(45) Date of Patent: Sep. 15, 2026

(54) SMART CONTRACT BASED USER FEEDBACK FOR EVENT CONTEXTS

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Sri Harsha Varada, Vizianagaram (IN); Venkatesh Kuntla, Telangana (IN)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 17/245,103

(22) Filed: Apr. 30, 2021

(65) Prior Publication Data

US 2022/0351218 A1 Nov. 3, 2022

(51) Int. Cl.
*G06Q 30/0201* (2023.01)
*G06F 1/16* (2006.01)
*G06N 20/00* (2019.01)

(52) U.S. Cl.
CPC ......... *G06Q 30/0201* (2013.01); *G06F 1/163* (2013.01); *G06N 20/00* (2019.01)

(58) Field of Classification Search
USPC ......................................................... 705/7.26
See application file for complete search history.

(56) References Cited

U.S. PATENT DOCUMENTS 9,495,361 B2 11/2016 Allen et al.
10,013,890 B2 7/2018 Allen et al.
10,282,409 B2 5/2019 Allen et al.
10,366,707 B2 7/2019 Allen et al.
10,477,271 B1 11/2019 Higbee
2015/0032658 A1 1/2015 Pantaliano et al.
(Continued)

FOREIGN PATENT DOCUMENTS

CN 111258725 A * 6/2020 ............. G06F 9/466

OTHER PUBLICATIONS

Anonymous, "Method of Real-Time Audience Feedback Analysis using a Smart Watch and Social Media", IP.com Prior Art Database Technical Disclosure, IP.com No. IPCOM000238793D, Sep. 18, 2014, 3 pages. (Year: 2014).*
(Continued)

*Primary Examiner* — Amanda Gurski
(74) *Attorney, Agent, or Firm* — CHIP LAW GROUP

(57) ABSTRACT

Mechanisms are provided for collecting user feedback information from sensors associated with user devices in accordance with smart contract rules. For an event context for an event, a provider portion of a smart contract is generated. The event context indicates an occurrence within the event that is detected through processing patterns of event data collected for the event, and the provider portion specifies a type of user feedback that is of interest to a provider. For the event context, a user portion of the smart contract is generated, where the user portion specifies a type of user feedback that a user of a user device permits to be shared with the provider. A smart contract comprising the smart contract rules is generated by combining the provider portion with the user portion. Collection of user feedback information from the user device is controlled according to the smart contract data structure.

20 Claims, 8 Drawing Sheets

(56) References Cited

U.S. PATENT DOCUMENTS

| | | | | |
|---|---|---|---|---|
| 2016/0042364 | A1* | 2/2016 | Zamer | G06Q 30/0201 705/7.29 |
| 2016/0224803 | A1 | 8/2016 | Frank et al. | |
| 2017/0142498 | A1* | 5/2017 | Blong | H04N 21/41407 |
| 2018/0124459 | A1* | 5/2018 | Knox | H04N 21/44218 |
| 2018/0249056 | A1* | 8/2018 | Chi | G06F 3/167 |
| 2018/0260825 | A1 | 9/2018 | Rashid et al. | |
| 2019/0035421 | A1* | 1/2019 | Allen | G06F 40/30 |

OTHER PUBLICATIONS

Amyx, Scott, "9 Provocative Ways for Brands to Flaunt Wearable Tech", Wired, Apr. 2014, accessed online Feb. 11, 2021, 6 pages.

Anonymous, "Method of Real-Time Audience Feedback Analysis using a Smart Watch and Social Media", IP.com Prior Art Database Technical Disclosure, IP.com No. IPCOM000238793D, Sep. 18, 2014, 3 pages.

* cited by examiner

SMART CONTRACT BASED USER FEEDBACK FOR EVENT CONTEXTS

BACKGROUND

The present application relates generally to an improved data processing apparatus and method and more specifically to mechanisms for gathering and processing user feedback for various event contexts based on smart contracts that specify shareable user feedback data and gathering entity specified user feedback data patterns of interest.

In the modern information technology based environment there has been a proliferation of wearable device technology. Individuals are increasingly using wearable technology and portable devices to monitor their own conditions, movements, location, etc. and essentially stay "plugged-in" to data networks and access sources of information and data. Examples of such wearable and portable technology include health monitoring devices, activity monitoring devices, portable communication and computing devices, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for collecting user feedback information from sensors associated with portable user computing devices in accordance with a set of smart contract rules. The method comprises generating, for at least one event context for an event, a provider portion of a smart contract data structure, the event context indicating an occurrence within the event that is detected through processing patterns of data in event data collected for the event, and the provider portion specifying a type of user feedback information that is of interest to a provider. The method further comprises generating, for the at least one event context for the event, a user portion of a smart contract data structure, where the user portion specifies a type of user feedback information that a user of a user device permits to be shared with the provider. The method also comprises generating a smart contract data structure comprising the set of smart contract rules by combining the provider portion with the user portion. Moreover, the method comprises processing event data representing data collected by sensors associated with an event to identify a pattern of data in the event data corresponding to the at least one event context, executing the set of smart contract rules in the smart contract data structure in response to detecting the at least one event context as a result of processing the event data, and collecting user feedback information from sensors of the user device in accordance with the set of smart contract rules. The user feedback information is user feedback information that is of interest to the provider, and is permitted to be shared with the provider by the user portion of the smart contract data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
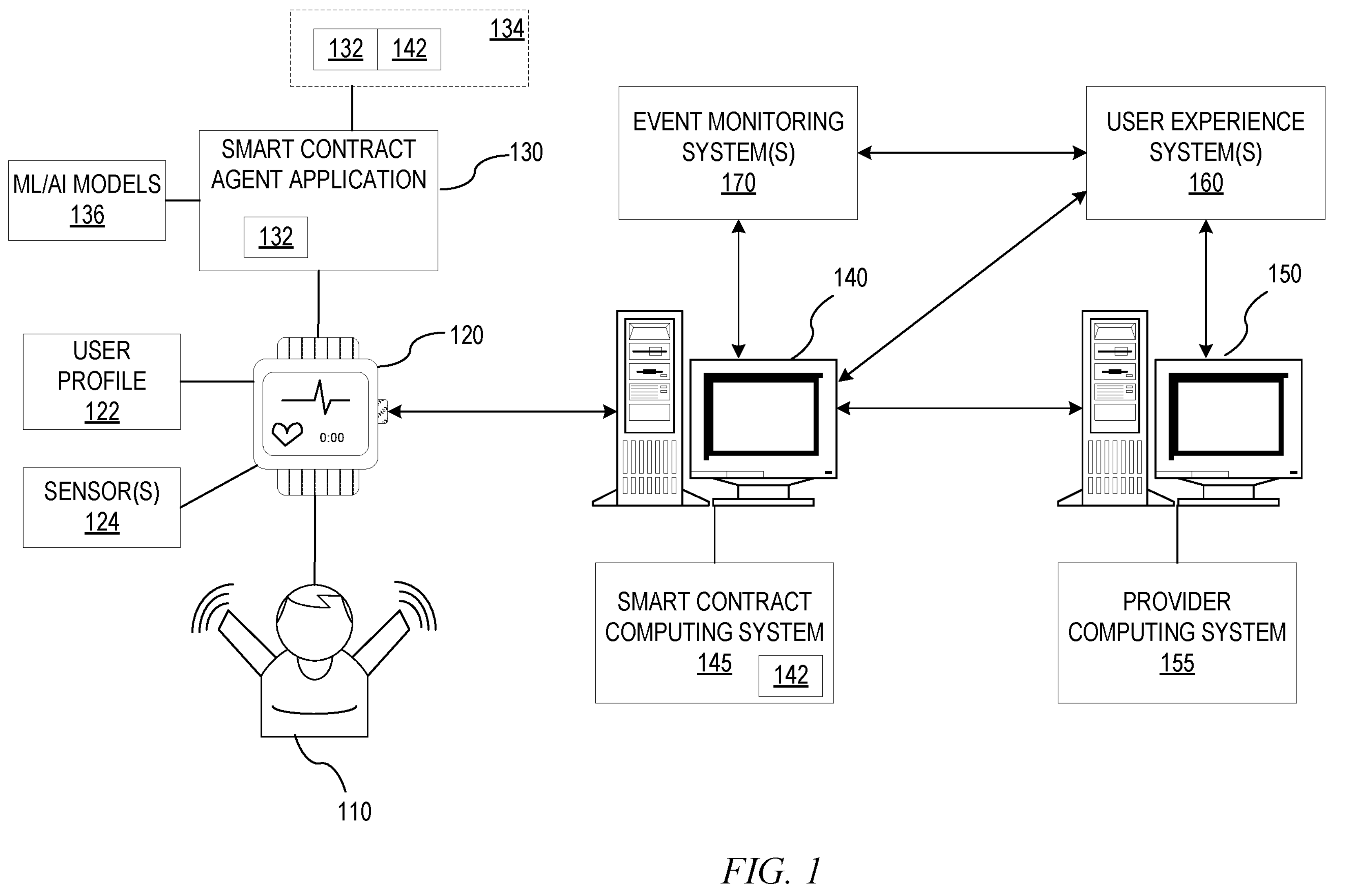
FIG. 1 is an example block diagram illustrating the primary computing elements of an improved computing tool, as well as the interactions of these computing elements of the improved computing tool, in accordance with one illustrative embodiment.

The proliferation of wearable and portable technology that can be used to gather data regarding user physical activity, biometrics, health related measurements, location, and the like, provides an opportunity to gather user feedback information for various event contexts, i.e. occurrences of a predetermined pattern of content or activity within an event, and use that gathered user feedback information to automatically or semi-automatically control devices and systems to improve user experiences and provide valuable information to providers associated with the events. However, such gathering of information for event contexts should also take into consideration the privacy concerns of individual users and gather only user feedback information that matches the patterns of user feedback that providers seek to gather, and only user feedback information that users specify is acceptable to the user for providers to gather. Moreover, due to increased virtualization and restrictions on in-person gatherings, it would be beneficial to be able to also gather such user feedback information from individuals that may be remotely located, physically and/or temporally, from the event context. In fact, with the increased usage of virtual avatars and the like, it would be beneficial to be able to obtain such user feedback information from virtualized versions of the users in virtual event spaces, such as from virtual avatars or the like, which are used to "attend" virtualizations of events.

The illustrative embodiments provide improved computing system mechanisms for establishing smart contract data structures comprising rules and configuration data specifying an agreement between a user and a provider as to the types of event contexts and patterns of user feedback information of interest to the provider, as well as user feedback information that the user specifies is acceptable to share with the provider. The illustrative embodiments further provide improved computing system mechanisms for automatically enforcing these smart contracts in response to detecting that the event context is present in event data in either real-time, as part of a time delayed broadcast, or as a playback of a previous event, when gathering user feedback information from user devices. The illustrative embodiments provide artificial intelligence mechanisms for performing pattern recognition and classification so as to detect the occurrence of event contexts in event data and inform user devices of the detection of such event contexts. Furthermore, the illustrative embodiments provide mechanisms for interfacing with agent applications deployed on user devices, the agent applications storing the smart contracts and having the logic to execute the smart contracts locally at the user device in response to requests specifying the detected event context and requesting user feedback information collection during a predicted time period associated with the event context. The execution of the smart contract in response to the detection of the event context limits the user feedback information shared with the provider to only that user feedback information that the user permits and only to the user feedback information that is of interest to the provider.

In addition, the illustrative embodiments provide improved computing system mechanisms that register event contexts of interest to providers and the patterns of user feedback information that the providers are interested in gathering from user devices. The patterns of user feedback information of interest may specify particular movements (e.g., movement of arms/legs indicating cheering, clapping, stomping, jumping, or the like), biometric patterns (e.g., increased heart rate, increase breathing, etc.), spoken inputs or sounds (e.g., cheering sounds, yells, particular words/phrases), or the like, which are indicative of particular user responses to the event context of interest. The occurrence of such patterns of user feedback information, and the gathering of the instances of occurrences of such patterns of user feedback information, provides information to providers as to the users' reactions to event contexts of interest which can then be used to automatically or semi-automatically drive controls to other devices and/or systems (referred to herein as experience systems) to improve the user experience of the event and/or provide content, offers, advertisements, and the like, to the user based on their determined reactions. Moreover, the gathered instances of occurrences of the patterns of user feedback information may be logged in a non-personally identifiable manner such that analysis of such instances can be performed at a remote time from the event.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the illustrative embodiments provide improved computing tools that are specifically directed to providing a smart contract based computing system for gathering user feedback information from user devices and, at least in some illustrative embodiments, control modification of a user's experience of an event based on the user feedback information gathered in accordance with the smart contract. FIG. 1 is an example block diagram illustrating the primary computing elements of an improved computing tool, as well as the interactions of these computing elements of the improved computing tool, in accordance with one illustrative embodiment. As shown in FIG. 1, as an example, a provider associated with an event, via a provider computing system 155 implemented on one or more server computing systems 150, may register with a smart contract based event context service provider computing system, hereafter referred to simply as a "smart contract computing system," 145 indicating the types of event contexts that are of interest to the provider. The smart contract computing system 145 may also be implemented on one or more server computing systems 140, for example. These systems 145 and 155 comprise specialized computer executed logic that perform the various functions attributed to these systems as described hereafter, with regard to the smart contract based user feedback information collection and processing, as well as controlling of event experience systems 160 based on the collection and processing of user feedback information from wearable or portable devices associated with users experiencing the event.

Alternative to the provider specifying the event contexts of interest, or in addition to provider specification of event contexts, the provider, via provider computing system 155, may specify the types of user feedback information patterns, or user reactions, that are of interest to the provider. Historical analysis of previous events may be performed to determine event contexts where such user reactions have been identified as being present in the past. Moreover, historical analysis may further be performed on previous event data to determine timing aspects for such user reactions relative to the timing of an event context, e.g., a time window or time frame around an event context where user reactions of particular types are detected to have occurred. Based on such historical analysis, mapping data structures of user reactions to event contexts may be generated and stored in association with the smart contract computing system 145, with such mapping including the predicted time windows/time frames for collection of user feedback information corresponding to user reactions. From these mapping data structures, the corresponding event contexts having the user reactions of interest to a provider may be selected from a registry of event contexts storing these mapping data structures, along with the various characteristics of these event contexts and corresponding user reactions, such as the timing windows/time frames.

For example, a provider may be interested in user reactions of cheering. Based on historical analysis of football (or soccer) matches, it may be determined that cheering occurs often when a goal is about to be scored, after a goal is scored, when there is a penalty kick, when teams take the field, etc. These event contexts are mapped to the user reactions such that if a provider indicates that they are interested in users cheering during an event, the event contexts for cheering may be retrieved and used to generate smart contracts between users and the provider. Moreover, timing window/time frame information for collection of user feedback information regarding user reactions of interest may be retrieved, e.g., for a goal about to be score, cheering occurs from the time point of the event context to approximately 30 seconds thereafter.

The provider itself may be, for example, a provider of goods and/or services and may be associated with the event through other contractual means. The provider may be a provider of the event or a third party provider of goods/services. For example, the provider may be a company or organization that wishes to advertise to attendees at the event, or persons that experience the event at a later time, such as through delayed broadcast or playback of a recording of the event. The provider may be a provider of a portion of the infrastructure or services that are integral to the providing of the event or facilities at which the event occurs. For example, at a concert or sporting event, the provider may be a provider of lighting systems, special effects systems, digital displays or advertising displays, or the like. In short, the provider may be any entity that is interested in gathering information regarding user reactions to event contexts within an event and potentially controlling the providing of content associated with the event and/or the experience encountered by users as audience members of the event, either in real-time or as part of a delayed broadcast or replay of a recording of the event. As such, the provider computing system 155 may interface with other user experience system(s) 160 to thereby control these user experience system(s) 160 to provide specific content or modify elements of the event so as to modify the experience encountered by the users, e.g., through providing targeted advertising based on user reactions to event contexts, modifying lighting or audio content of the event based on user reactions to event contexts, controlling special effects systems, such as pyrotechnics, video screens, fog machines, laser effect systems, or any other system that can be used to modify the experience of the event for the users or attendees of the event.

For a provider and an event, the illustrative embodiments may establish a provider portion of one or more smart contract data structures for the various event contexts corresponding to the providers' specifications of event contexts of interest and/or event contexts of interest corresponding to provider specified user reactions of interest, as determined from historical analysis of previous event data. That is, a smart contract data structure 134 may be established for each event context and may specify both the provider portion 142 and the user portion 132 of the smart contract 137 for the particular event context. The provider portion 142 specifies the type(s) of user feedback information patterns or user reaction data to gather on behalf of the provider, with the provider portion 142 being generated and distributed to user devices 120 for composing smart contract data structures, such as smart contract data structure 134. The user portion 132 of the smart contract data structure 134 specifies the type(s) of user feedback information, patterns, or user reaction data that the user permits the smart contract computing system 145 to gather on behalf of the provider, and may be stored in each user device 120 that is used to gather this user feedback information, patterns, or user reaction data.

Thus, for an event, and a provider, there may be a set of one or more smart contract data structure provider portions 142 generated and stored in the smart contract computing system 145, one or more for each event context of interest, and one or more smart contract data structure user portions 132 generated and stored in the user device(s). The provider portion 142 and user portion 132 may be combined at the user device 120 to generate a smart contract data structure 134 which may itself be a set of executable logic for enforcing the gathering, and restrictions on gathering, of user feedback information, patterns, and user reaction data for reporting to the smart contract computing system and/or provider computing system(s).

For example, a provider may specify that they are interested in cheering (user reaction or user feedback information pattern) by the attendees (users) at a football (or soccer) match (event) and may also specify that the provider is interested in attendee reactions corresponding to goals about to be scored (event context). The smart contract computing system 145 registers the provider and uses historical analysis of previous football (soccer) matches to determine that attendees typically cheer when a goal is about to be scored, shortly after a goal is scored, when a red card is shown, or a team takes the field at the beginning of the match. Thus, for each of these event contexts within the event, a corresponding provider portion 142 of a smart contract is generated indicating that the provider wishes to gather cheering data from user devices 120 when the corresponding event context is detected in event data captured by event monitoring systems 170 for an event. The even monitoring systems 170 may comprise video sensors, audio sensors, or the like, for capturing representations of the event in a data format that can be analyzed to detect event contexts. For example, the event monitoring systems 170 may comprise computing systems that receive captured image data from one or more cameras positioned to capture images of the event taking place and the data may be analyzed using image recognition and video pattern analysis computer logic to detect patterns in the image data representative of particular event contexts, e.g., a soccer player about to score a goal, a red card being displayed, etc. Such image analysis is generally known in the art and thus, a more detailed description is not provided herein. Similar types of analysis may be performed with other types of event data including audio data with audio analysis, and such analysis may comprise multiple different modes of event data, e.g., both video and audio analysis.

The event context information specified in the provider side smart contract portion (or simply provider portion) 142 of the smart contract may further specify the time window/time frame around the time stamp of the detected event context in which the user feedback information is to be captured and analyzed to identify the presence of user feedback information patterns, user reaction data, or the like. It should be appreciated that such provider side smart contract portions 142 may be reusable for multiple events, e.g., multiple different football (soccer) matches. In some embodiments, rather than having separate provider side smart contract portions 142 for separate event contexts, a single provider side smart contract portion 142 may have multiple event contexts associated with it such that if any of the event contexts are detected, the single provider side smart contract portion (or provider portion) 142 is triggered.

As noted above, the smart contract data structure(s) 134 comprise both a provider portion 142 and a user portion 132. The user portion 132 specifies the user feedback information, patterns, and/or user reaction data that the user is willing to share with the provider. The shareable user feedback information, patterns, and/or reaction data (hereafter referred to collectively as user feedback information patterns) may be specified by the user via a user profile data structure 122 stored in their associated user device(s) 120, for example. The shareable user feedback information patterns may be generally specified for all event contexts or, in some illustrative embodiments, may be specific to particular event contexts or types of events.

By pairing the user portion 132 with the provider portion 142 for the event context of an event, a smart contract data structure 134 is generated that comprises one or more computer executable rules specifying the trigger, i.e., the event context, the user feedback information patterns that the provider is interested in collecting from the user's device(s) 120, and the user feedback information and/or user reaction data that the user is willing to share with the provider, such as specified in the user profile 122. Thus, through the execution of the smart contract rules in the smart contract data structure 134, the collection of user feedback information and/or user reaction data in response to detected event contexts in event data from the event monitoring systems 170 may be controlled such that the parties involved in the smart contract have their interests complied with. That is, the provider collects the data that it is interested in collecting to the extent that the users 110 are willing to share that data.

It should be appreciated that the specification of the user feedback information patterns that the provider is interested in may specify particular patterns of data monitored by one or more sensors 124 of one or more user devices 120 associated with the user 110. This may be information indicating the occurrence of the pattern, but may not include the individual data that indicates the presence of the pattern. For example, the pattern may be a pattern of motions indicating rapid and elevated movement of the user's arms and heart rate information indicating excitement, which together indicate that the user is cheering in response to an event context. The information shared with the provider may be that the user 110 is cheering i.e., the pattern of user feedback information was detected to be present, but may not include the individual motion information or heart rate measurements themselves. Moreover, the user feedback information or user reaction data may be shared with the provider in an anonymized manner where any personally identifiable information, such as the identity of the user or the user's device(s), may not be included or may be removed from the information shared with the provider via the smart contract computing system 145.

The pairing of the user portion 132 with the provider portion 142 may be accomplished by distributing the provider portion 142 to user devices 120 for pairing with the user portion 132 stored on the user device 120. A smart contract data gathering and sharing agent application (or simply smart contract agent application) 130 installed on the user device may execute the smart contract rules 134 on the user device so as to identify the occurrence of a specified pattern of user feedback information and/or user reaction data from the sensors 124 associated with the user device 120 or with which the user device 120 is in data communication, e.g., the sensors may be in wireless communication with the user device 120 such that they may be deployed remotely from the user device 120. The smart contract agent application 130 may be triggered in response to an interrogation signal or the like, from the smart contract computing system 145 that specifies an event context for an event at which the user 110 is present or which the user 110 is engaged in as part of a delayed broadcast or replay of a recording of the event. That is, the smart contract computing system 145 may receive event data from sensors of the event monitoring systems 170 monitoring an event, e.g., cameras performing image capturing of the event from various viewpoints, audio sensors capturing audio input from various points relative to the occurrence of the event, or the like, and processes the event data through one or more machine learning computer models to classify the event data as to one or more of a plurality of predetermined event contexts. In response to an event context of interest to a provider being detected through such sensor based capturing of event data by the event monitoring systems 170 and the processing of the event data through the one or more machine learning computer models by the smart contract computing system 145 to classify event data into one or more event contexts, a corresponding interrogation signal may be transmitted by the smart contract computing system 145 to each user device 120 that is registered as being present at the event, or otherwise experiencing the event through a delayed broadcast or replay of the event data, where this interrogation signal may specify the event context as well as a time frame or time window, relative to the time stamp of the event context, in which to capture user feedback information and evaluate user feedback information with regard to patterns or user reactions of interest to the provider.

In response to the interrogation signal being received by the user device 120 and processed by the user device 120 to trigger the smart contract agent application 130, the smart contract agent application 130 may collect user feedback information, or sensor data, from the user device associated sensors 124 and perform analysis of the gathered sensor data using one or more machine learning trained, or AI based historical pattern recognition, analysis computer models 136 to determine if the gathered sensor data corresponds to patterns of sensor data indicative of a particular user feedback information pattern or user reaction of interest to the provider, as specified in the smart contract data structure(s) 134. If a user feedback information pattern or user reaction of interest is determined to be present within the time frame or time window specified in the interrogation signal, then the smart contract agent application causes a response communication to be transmitted from the user's device 120 back to the smart contract computing system 145 with user feedback information or user reaction data requested by the provider in the provider portion 142 of the smart contract data structure 134, and which the user has authorized to be provided in accordance with the user's portion 132 of the smart contract data structure 134.

Thus, the smart contract agent application 130 collects data in accordance with the feedback patterns and/or reaction data of interest and the user's specified shareable information specified in the rules of the established smart contract data structure(s) 134 corresponding to the specified event context. The collected data is input to a machine learning trained computer model 136 of the smart contract agent application 130, or other analytics engine of the agent application, that is trained to recognize patterns in collected data and classify the patterns with regard to specific types of user feedback information and/or reaction data patterns, e.g., classify input sensor data from sensors 124 into one or more predetermined classifications of user reactions, motions, activities, or other user feedback information patterns.

The training of the machine learning or AI based historical analysis computer models 136 may comprise collection of sensor data from sensors 124 for previous user actions and performing machine learning to learn the user's specific patterns of sensor data corresponding to particular types of user reactions, motions, activities, or other user feedback information patterns. For example, through an interactive configuration process, the smart contract agent application 130 may request that the user perform particular types of user feedback information patterns and may collect sensor data from the sensors 124 during the performance of such feedback information patterns to thereby learn the particular way that the user 110 performs the user feedback information patterns, e.g., ask the user to cheer and detect motions of the user's arms, legs, speech sounds, heart rate, and the like, to generate a pattern of sensor data indicative of the activity of cheering.

The machine learning or AI based historical analysis operates to process features extracted from the sensor data input and categorize the combination of features as to one of a plurality of user reactions, e.g., with regard to arm motions the user reactions may be cheering, shaking hands, drinking a drink, etc. The predicted categorization may then be compared to the actual correct categorization and an error may be determined. The operational parameters of the computer model that contributed most to the misclassification may then be modified so as to reduce the error between the prediction and the correct categorization. The process is then repeated over a plurality of epochs until there is convergence, i.e., the error is equal to or less than a threshold, or until a predetermined number of epochs have occurred. The computer model is then determined to have been trained and may be deployed for runtime use. Similar training may be performed using historical information for previous events engaged in by the user with the user specifying the activities or user feedback information patterns that the user was performing so as to provide the correct classifications or ground truth for the training process.

The trained machine learning or AI based historical analysis computer models (hereafter referred to collectively as the machine learning (ML) model) 136 receive sensor data from sensors 124 associated with the user's device 120, e.g., a mobile phone device having accelerometers, gyroscopes, ambient light sensors, global positioning system (GPS) sensors, proximity sensors, thermometer sensors, audio input capture devices, video capture devices, or the like, and/or a health monitoring device that has heart rate sensors, breathing sensors, oxygen level sensors, activity sensors, and the like. The various sensor data may be processed to extract features, i.e. points of interest in the data, that are input to one or more ML model(s) 136 which then classify the sensor data with regard to one or more predetermined user reactions. In some illustrative embodiments, a plurality of ML models 136 may be provided to process different sensor data and generate predictions of user feedback patterns or user reactions with regard to these different sensor data and then the predictions may be aggregated to generate a final prediction of user feedback pattern information or user reaction data, e.g., a first ML model may process arm motion data, a second ML model may process biometric data such as heart rate, breathing, blood oxygen level, etc., and the first and second ML models may generate first and second predictions (e.g., probability scores associated with different predetermined user feedback information patterns or user reaction data) which are then aggregated (e.g., using a weighted summation) to generate a single prediction of the user feedback information pattern or user reaction data, e.g., a classification of the user's feedback or user reaction.

Having classified or categorized the sensor data into one or more user reactions, the smart contract agent application 130 that is local to the user's device 120 may then compare the one or more user reactions to those of interest to the provider as specified in the smart contract data structure(s) 134. That is, the provider portion 142 of the smart contract data structure 134 specifies the types of user feedback information patterns, or user reactions, that are of interest to the provider. If the categorization of sensor data indicates that the predicted user reaction category matches one of the patterns or user reactions in a smart contract data structure 134, the smart contract agent application 130 determines if the user has given permission for the smart contract agent application 130 to transmit user feedback information, user feedback pattern information, user reaction data, or the like to the provider. This determination looks to the user portion 132 of the smart contract data structure 134 and executes the corresponding rules to cause the user device 120 to transmit the approved user feedback information back to the smart contract computing system 145.

The smart contract computing system 145 may compile user feedback information from a plurality of different user devices 120 of different users 110 that attend the event either in real time or through a delayed broadcast or replay of event data captured for the event. The user feedback information transmitted to the smart contract computing system 145, as well as the detected event contexts, have associated time stamp metadata that is used to correlate the user feedback information with event contexts. In addition, if permitted by the user 110 via their user profile 122, the user feedback information may also include location information such that the user's position relative to the event context may be determined.

The smart contract computing system 145 may analyze the user feedback information to identify types of user reactions or user feedback information patterns exhibited by users 110, what event contexts they are associated with as determined by the time stamp information, and the relative locations of the users 110 exhibiting the various user feedback information patterns relative to the event context, e.g., what side of the football (or soccer) pitch the user is located on when the event context occurs. The results of this analysis may be provided to the provider computing system 155 along with the user feedback information patterns or user reactions collected by the smart contract computing system 145 for storage and later analysis if desired.

Moreover, these results may be used by the smart contract computing system 145 and/or the provider computing system 155 to drive control signals to the user experience system(s) 160 to control providing of content or performance of actions by various systems to modify the user experience of the event. For example, provider advertising may be initiated via the user experience system 160 to all of the users or a select subset of users that are attending the event, e.g., sending advertising to video and audio output devices associated with particular locations around the event physical premises corresponding to user feedback information patterns or user reactions of interest. For example, if it is determined that one side of the football pitch is cheering for team A when they are about to score a goal, an advertisement for merchandise associated with team A may be displayed on the side of the football pitch cheering for team A. As another example, such advertising may be transmitted directly to the user devices 120 in response to detecting sufficient user feedback information patterns or user reactions, e.g., more than X % of the users are cheering, then transmit advertisement to user devices.

It should be appreciated that in the example illustrative embodiments described above, the smart contract data structure 134 is generated by the smart contract agent application 130 that is local to the user device 120. However, such an arrangement is not a requirement of the illustrative embodiments. To the contrary, in other illustrative embodiments, the smart contract data structure 134 may be generated at the smart contract computing system 145 and then transmitted to the user device 120 in response to the user entering the physical premises of the event, logging onto a source of a broadcast of event data corresponding to the event, or otherwise accessing a source computing system providing event data in a recording of the event. For example, the user 110 may configure a user profile 122 and this user profile 122 may be uploaded to the smart contract computing system 145 when the user 110 purchases tickets for the event or otherwise registers for the event via the smart contract computing system 145 or associated event provider computing system (not shown). In performing such registration, the user 110 via their user profile 122 consents to the providing of particular user feedback information or pattern/reaction data by providing the user portion 132 of the smart contract to the smart contract computing system 145. The smart contract computing system 145 may then comprise logic to generate the smart contract data structure 134 by combining the provider portion 142 with the user portion 132, and may do so for each event context of the event type for the event that the user has registered to attend. That is, the provide may specify different event contexts of interest, or user feedback information patterns of interest, for different types of events, e.g., football matches, theatrical performances, musical performances, etc., and thus, there may be different provider portions 142 for different event types, and for different event contexts of the different event types. The corresponding provider portion(s) 142 for the event type of the event that the user registers for will be retrieved and paired with the user portion 132 provided by the user's device 120 so as to generate one or more smart contract data structures 134. The registration of the user may include specifying a unique device identifier of the user's device 120, a user account identifier, or the like, so as to be able to identify the later presence of the user in connection with the event.

Thereafter, when a user enters the physical premises of the event, or when the user logs onto a website or otherwise accesses a data stream broadcasting the event or replaying a recording of the event, the user device identifier, user account identifier, or the like, may be transmitted to the smart contract computing system 145 by the user's device 120 and used to detect the presence of the user with regard to the event. In response to detecting that the user is experiencing the event, the smart contract computing system 145 may transmit the generated smart contract data structure(s) 134 to the user's device 120 which then configures the smart contract agent application 130 to execute the smart contract data structure(s) 134, such as in response to interrogation signals transmitted from the smart contract computing system 145.

It should also be appreciated that while the above example illustrative embodiments trigger the sending of user feedback information to the smart contract computing system 145 based on the detection of event contexts by the smart contract computing system 145 in event data coming from the event monitoring systems 170, the illustrative embodiments are not limited to such. Rather, in some illustrative embodiments, the sensors 124 of the user device 120 monitor the user's motions, biometrics, and other user feedback information on a continuous basis, with each type of user feedback information being regarded as a separate user feedback stream. The smart contract agent application 130, executing the rules of the smart contract data structure 134, determines which user feedback streams are of interest to the provider (specified in provider portion 142) and have been authorized for sharing of user feedback information with the provider by the user (specified in user portion 132). These user feedback information streams may be continuously or periodically transmitted to the smart contract computing system 145 for evaluation and correlation with event contexts detected in the event data, such as based on corresponding time stamps. If there is a correlation between event context and user feedback information, then that correlation may trigger reporting of user feedback information patterns or user reaction data to the provider computing system 155. Thus, in these illustrative embodiments, the collection of user feedback information may be performed continuously and is not dependent upon interrogation signals from the smart contract computing system 145 in response to detected event contexts.

In addition to the above, it should be appreciated that in some illustrative embodiments, user feedback information may be gathered with regard to virtual representations of the user 110, such as via virtual avatars or the like, associated with virtual reality (VR) and/or augmented reality (AR) enabled computing systems used by the user 110. That is, as virtualized attendance of events is used more often, the VR/AR enabled computing systems, which typically have associated sensor devices such as motion sensors, audio capture devices, gaze detection devices, and the like, may be used to collect user 110 feedback information. The data gathered by such VR/AR enabled systems may be used to represent a user as a virtual avatar in a virtual environment, or may otherwise be used to represent a perspective view of the event for the user 110 as if they were physically present at the location where the event is taking place. As such, the virtual avatar motions, audio output, and the like, may be captured from the VR/AR enabled computing system's sensor feeds from the VR/AR equipment, similar to wearable user devices 120 on the physical person of the user 110.

Moreover, as the user 110 experiences the event via a virtualized environment, the user experience systems 160 may likewise be controlled to modify the virtual environment through which the user 110 experiences the event. That is, rather than having to control equipment that modifies the experience within a physical environment, such as through controlling lighting systems, video devices, pyrotechnic devices, and the like, virtualized presentation of the event may be modified digitally via the user experience systems 160 in response to user feedback information patterns or user reactions to detected event contexts. Such modification of the virtualized presentation may include providing overlays on the virtualized environment, providing advertising or news feeds at designated portions of the display of the virtualized environment, triggering digital special effects, adjusting digital lighting or advertising in virtualized portions of the virtual environment, or the like. Any modification that may change the user's experience of the virtualized environment during the user's experiencing of the event may be implemented without departing from the spirit and scope of the present invention.

Thus, the illustrative embodiments provide mechanisms for establishing smart contract data structures specifying provider side requests for user feedback information gathering on the part of user wearable or portable devices, or from virtualized representations of users, and user side permissions as to the types of user feedback information, user feedback information patterns, or user reaction data that the user is allowing the user devices and intermediate computing systems to collect and transmit to the provider. Moreover, the illustrative embodiments provide mechanism that allow the user feedback information, patterns, or user reaction data to be analyze and used to drive controls to user experience systems so as to modify the user's experience of the event. At the heart of the illustrative embodiments is the smart contract computing system that provides an improved computing tool to facilitate the creation of these smart contract data structures, detection of event contexts, and control the transactions of user feedback information, patterns, or user reaction data between the user devices and the provider computing systems.

Figure 2:
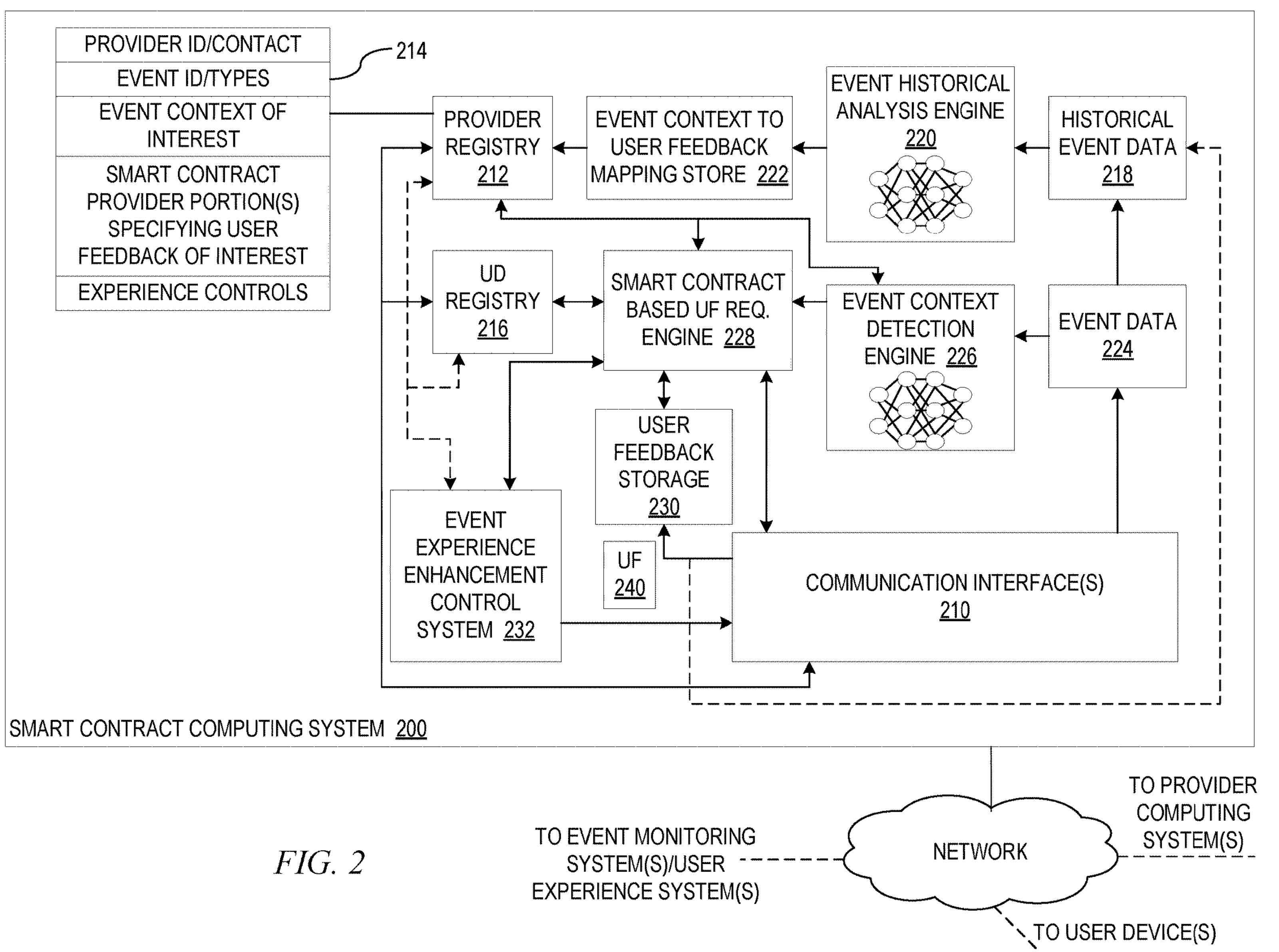
FIG. 2 is an example diagram illustrating operational elements of a smart contract computing system in accordance with one illustrative embodiment.

FIG. 2 is an example diagram illustrating operational elements of a smart contract computing system in accordance with one illustrative embodiment. As shown in FIG. 2, the smart contract computing system 200 comprises a communication interface for interfacing with one or more wired and/or wireless data communication networks 202 which in turn provides a communication infrastructure for exchanging data with user devices, provider computing systems, event monitoring computing systems, and/or user experience systems. Data flows through the communication interface(s) 210 which provide logic for formatting and processing data, such as data packets or the like, and/or control messages, and providing the data to their target destinations. For example, in accordance with at least one illustrative embodiment, a provider of goods/services may log onto the smart contract computing system 200 and register in the provider registry 212, via one or more graphical user interfaces and the like, by providing provider registry data that indicates for what types of events the provider wishes to have user feedback information collected, what event contexts for these event types that they wish to collect user feedback information for, what types of user feedback information they are interest in collecting, and the like. As mentioned previously, the provider may specify particular types of user feedback information patterns or user reaction data that the provider is interested in rather than just the raw user feedback information collected by the sensors themselves, e.g., patterns indicative of cheering user reactions, patterns indicative of excitement, etc.

In cases where the provider specifies the types of user feedback information patterns, or user reactions, that are of interest to the provider, event historical analysis may be performed by the event historical analysis engine 220 on historical event and user feedback data in the storage 218 which was stored for previously conducted events of a same type as the event type that the provider is registered for, in order to identify event contexts where such user feedback information patterns or user reactions have been historically detected to be present. This historical analysis performed by the event historical analysis engine 220 may utilize one or more trained machine learning (ML) or artificial intelligence (AI) computer models that execute on the historical event data in the historical even data and user feedback storage 218 to identify patterns of event data corresponding to predefined event contexts, and may also execute on historical user feedback information contained in the historical event and user feedback storage 218, to identify patterns of user feedback information indicative of predefined user feedback information patterns or user reactions. Time stamp information may be used to correlate the user feedback patterns or user reactions with detected event contexts. Based on evaluating such correlations for multiple different events of the same event type, it can be determined which event contexts routinely have the same user feedback information patterns or user reactions. Thus, a mapping of event context to user feedback information patterns or user reactions may be generated and stored in the event context to user feedback mapping store 222.

The entries in the user feedback mapping store 222 may be used to match provider specified user feedback information patterns or user reactions to particular event contexts for a specified event type. That is, for a particular event type, and a particular user feedback information pattern or user reaction of interest to the provider, corresponding entries in the event context to user feedback mapping store 222 may be retrieved which specify the event contexts for which the user feedback information pattern or user reaction of interest was previously detected in historical event and user feedback data 218. For example, if the provider indicates that for a football match (event type) the provider is interested in user cheering (user feedback pattern), then through a lookup in the event context to user feedback mapping store 222, entries corresponding to football matches may be identified, and then a subset of entries for which user cheering is an associated user feedback information pattern may be selected and their corresponding event contexts specified as event contexts for which provider portions of smart contracts are to be generated, i.e., the identified event contexts are added to the providers entry in the provider registry 212 as event contexts for which the specific user feedback information pattern or user reaction data of interest is to be collected.

In addition, as previously described above, historical analysis may further be performed on previous event data and user feedback information to determine timing aspects for such user feedback information patterns or user reactions relative to the timing of event contexts to thereby specify a time window or time frame around an event context where user feedback information patterns or user reactions of particular types are detected to have occurred. This time window or time frame information may be stored in the mapping store 222 entries as well so that this information may be used to specify the time window or time frame for which user feedback information is gathered and analyzed in accordance with the resulting smart contract data structures, e.g., user feedback information from sensors associated with a user device are collected for 30 seconds after an "imminent goal" event context is detected, and this collected data is then analyzed to determine if a cheering pattern or user reaction is detected.

Thus, based on such historical analysis, the mapping data structures of user reactions to event contexts may be generated and stored in the event context to user feedback mapping store 222, with such mapping including the predicted time windows/time frames for collection of user feedback information corresponding to user reactions. The mappings in the mapping store 222 may be used to update the provider registry entries 212 for registered providers so as to include various event contexts where user feedback information patterns or user reaction data of interest may be found in events of the event type of interest to the provider. For an event type, and for the event contexts of interest, provider portions of smart contracts may be generated and stored in association with the provider registry entry 214. Thus, for example, a provider registry entry 214 may be generated that specifies the identity and contact information of the provider, the event types and/or event id of events of interest to the provider, the smart contract provider portion(s) specifying user feedback information patterns or user reactions of interest in association with event contexts of interest, as well as user experience system controls in response to such user feedback information patterns or user reactions of interest being detected.

The smart contract computing system 200 further receives user device registry information 216 from user devices and/or users that are physical present at the location where the event is taking place or from user's computing devices logged on remotely to computing systems providing delayed broadcasting or replaying of recorded event data. The user device registration in the registry 216 may specify the user device identifier(s), e.g., MAC address, IP address, mobile number, or any other unique identifier that may allow data communication to/from the specific user devices. In some illustrative embodiments, the user device registration may further include the user portion of smart contracts, such as in embodiments where the user contract is generated at the smart contract computing system 200 and distributed back to the user devices. The user device registry entries may be generated in response to the user registering for an event, as part of a logon process for logging onto a server or website through which event data is accessed, or the like. In some cases, interrogation signal transmission systems may be present at the location of the event and may interrogate user devices as the user enters the physical location of the event. As part of this interrogation, the user may be requested to consent to certain user feedback information collection and the response provided as part of a user device registration.

In response to the registration of a user device in the user device registry, the provider portion(s) for the providers registered for the event may be distributed to the registered user devices. The registered user devices, upon receiving the provider portion(s) generate smart contract data structures locally with the smart contract agent applications that are pushed to the registered user device(s) in response to registration. The smart contract agent applications may combine the provider portion(s) with a user portion generated from user profile information stored locally on the user device(s) to thereby generate one or more smart contract data structures comprising executable rules for processing user feedback information and reporting user feedback information, user feedback information patterns, or user reaction data back to the smart contract computing system 200. Alternatively, in some illustrative embodiments, in response to the user device registration, smart contracts comprising the provider portion and user portion may be generated and stored in association with the user device registry 216 entries for the event and may be used to compare to detected event contexts to control sending of requests to user devices to perform user feedback information pattern or user reaction data detection. Thus, in some illustrative embodiments, the smart contract data structures are generated locally at the user devices using smart contract agent applications, and in other illustrative embodiments, the smart contract data structures are generated at the smart contract computing system 200 and associated with registered user device entries in the user device registry 216.

The communication interface(s) 210 further provide data communication logic for receiving and processing event data 224 from one or more event monitoring computing systems, and user feedback (UF) information pattern or user reaction data 240 from user devices, via the one or more data networks 202. The received event data 224 may be analyzed by the event context detection engine 226 employing one or more trained machine learning computer models or AI based computer models that analyze the features of the event data 224 and categorize portions of the event data 224 as to a set of predetermined event contexts. The machine learning computer models or AI based computer models generate probability scores for the various predetermined event contexts to determine a likelihood that the corresponding predetermined event context is present within the event data 224 based on processing the various features extracted from the event data 224 and performing processing of these features, such as through various layers of nodes of neural network computer model(s) implemented as part of the machine learning or AI based computer model. In some illustrative embodiments, like the machine learning or AI based computer model(s) of the event historical analysis engine 220, the machine learning or AI based computer model(s) of the event context detection engine 226 may be convolutional neural networks (CNNs), deep learning neural networks (DNNs), support vector machines (SVMs), or any other type of machine learning or AI based computer model(s) that may be trained through a machine learning process, such as supervised, unsupervised, or semi-supervised machine learning. The processing of the event data 224 may be performed continuously with a moving time window, for example, and if a corresponding event context is detected as being present within the time window, i.e. a probability value for an event context meets or exceeds a predetermined threshold probability, the event context is indicated as being present and the corresponding time stamp for the event context is recorded and provided to the smart contract based user feedback engine 228.

The smart contract based user feedback engine 228 accesses the provider registry 212 and identifies whether the detected event context matches an event context of interest to a provider for the event type of the event. If so, an interrogation signal or data message is sent to registered user devices, as identified through the user device registry 216, via the communication interface(s) 210 and the one or more data networks 202. The interrogation signal or data message includes an indication of the event context detected. The smart contract agent applications executing on the user devices receive the interrogation signal or data message data and execute the smart contract rules that are triggered by the particular event context detected, by matching the event context in the interrogation signal/data message with the event contexts specified in the provider portions of the smart contract data structures and collecting user feedback information from sensors associated with the user device, where the collected user feedback information may be the type of user feedback information requested by the provider in the provider portion and permitted by the user in the user portion of the smart contract data structure. As noted previously, the event context information specified in the provider portion of the smart contract may further specify the time window/time frame around the time stamp of the detected event context in which the user feedback information is to be captured and analyzed to identify the presence of user feedback information patterns, user reaction data, or the like.

The specification of the user feedback information patterns or user reaction data in the provider portion may specify particular patterns of data monitored by one or more sensors associated with the user device. The smart contract agent application may employ one or more machine learning or AI based computer models, similar to the machine learning or AI based computer models used in engines 220 and 226, but trained through machine learning processes to recognize patterns of user feedback information from the various sensors and categorize the user feedback information into one or more categories of user feedback information patterns or user reactions, as discussed previously. Such models may combine different types of sensor data or may comprise different models for different types of sensor data, each model generating a prediction of a categorization of the user feedback information with the plurality of predictions being aggregated to generate a single final prediction of a user feedback information pattern or user reaction, e.g., such as through a weighted aggregation function, majority vote, or any other aggregation algorithm suitable to the particular implementation.

Thus, in response to the interrogation signal/data message being received by the user device and processed by smart contract agent application executing on the user device, the smart contract agent application collects user feedback information, or sensor data, from the user device associated sensors and performs analysis of the gathered sensor data using one or more machine learning trained, or AI based historical pattern recognition, analysis computer models to determine if the gathered sensor data corresponds to patterns of sensor data indicative of a particular user feedback information pattern or user reaction of interest to the provider, as specified in the smart contract data structure(s). If a user feedback information pattern or user reaction of interest is determined to be present within the time frame or time window specified in the smart contract data structure, or alternatively in the interrogation signal/data message in embodiments where this information is included in the interrogation signal/data message instead of in the smart contract data structure, then the smart contract agent application causes a response communication to be transmitted from the user's device back to the smart contract computing system 200 with user feedback (UF) information or user reaction data requested by the provider in the provider portion of the smart contract data structure, and which the user has authorized to be provided in accordance with the user's portion of the smart contract data structure.

The received user feedback (UF) information, or user reaction data, 240 may be stored in the user feedback storage 230, via the communication interfaces 210. The smart contract based user feedback engine 228 may access the user feedback information 240 from the user feedback storage and/or stored in the historical event and user feedback data store 218.

The smart contract based user feedback engine 228 may analyze the user feedback (UF) information to identify types of user reactions or user feedback information patterns exhibited by users, what event contexts they are associated with as determined by the time stamp information associated with the event contexts detected by the event context detection engine 226 from the event data 224, and the user feedback information 240 reported from the user devices, and the relative locations of the users exhibiting the various user feedback information patterns relative to the event context, such as may be reported with the user feedback information 240 based on user device GPS location data, for example. The results of this analysis may be provided to the provider computing system, via the communication interfaces 210 and one or more data networks 202, along with the user feedback information patterns or user reactions collected by the smart contract computing system 200 for storage and later analysis if desired.

Moreover, these results may be used by the smart contract based user feedback engine 228 and/or the provider computing system to drive control signals to the user experience system(s) to control providing of content or performance of actions by various systems to modify the user experience of the event. That is, the smart contract based user feedback engine 228 may analyze user feedback information 240 and determine, for each user device, the types of user feedback information patterns, user reactions, corresponding event contexts, and the like, being exhibited by individual users. The results of this analysis may be used to drive controls of user experience systems for individual users, such as via targeted advertising being pushed to the user device, for example. The results of such analysis may also be provided to the event experience enhancement control system 232 which then performs analysis across a plurality of users experiencing the event so as to control a more macro level user experience system that will affect a plurality of users, e.g., controlling lighting systems, controlling displays or special effects systems within an arena, theatre, or other venue for the event.

For example, the event experience enhancement control system 232 may access provider registry information 212 to determine experience controls specified in the provider entry of the provider registry, where these experience controls specify the type of experience control to perform in response to particular patterns of user feedback being detected by a single user and/or across a plurality of users. As an example, in response to a particular pattern of user feedback information and/or user reactions across a plurality of users experiencing the event, the event experience enhancement control system 232 may send control signals/data messages to user experience system(s) 160 in FIG. 1, to instruct the user experience system(s) 160 to modify settings of user experience controllable devices, e.g., lights, video displays, audio output devices, or the like, to generate a desired output to modify the user experience of the event, e.g., output an advertisement on video displays at the event venue, flash lights, initiate audio output of a recording, or the like. In some cases, the user experience systems may broadcast advertisements to user devices, modify the delayed broadcast or replay of event data to include additional content based on the user feedback information patterns or user reactions, or other modification of the user experience, such as those previously described above, for example.

Thus, an improved computing tool is provided that is able to collect user feedback information in accordance with automatically executed smart contract rules which may themselves be automatically generated based on a combining of provider portions and user portions of the smart contract rules. The user feedback information may be automatically collected in response to the automatic detection of event contexts of interest in event data for an event using trained machine learning or AI based computer models that analyze the event data to identify the event contexts. The collected user feedback information may be analyzed using machine learning or AI based computer models to identify patterns indicative of user reactions that are of interest to a provider. User feedback information, user feedback information patterns, or user reaction data may be reported back to the provider and may be used to control user experience systems to enhance the users' experience of the event based on their detected feedback or user reactions.

Figure 3:
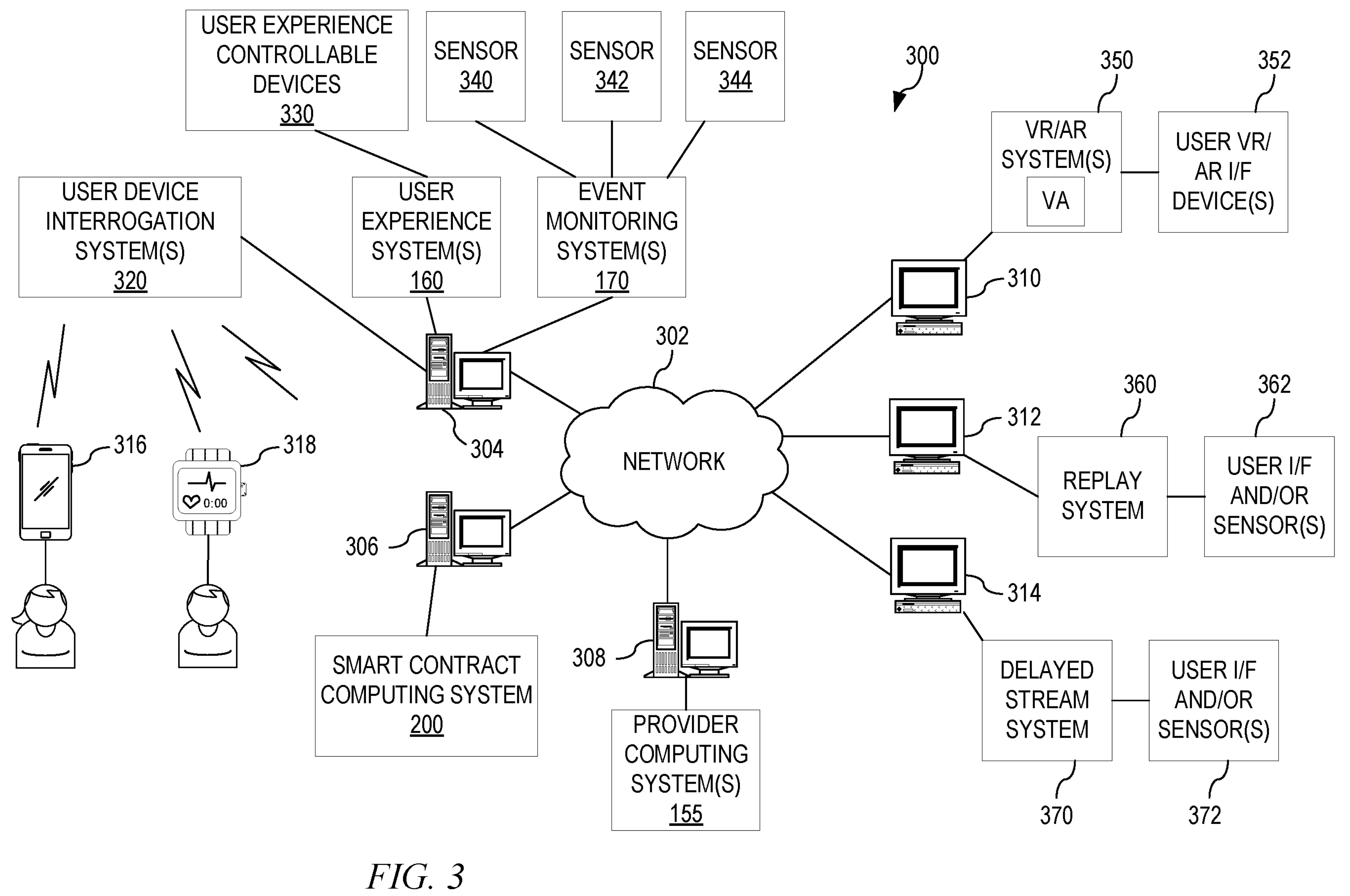
FIG. 3 is an example diagram illustrating a distributed data processing system implementing a smart contract computing system, event data source/control computing system, provider computing system, and user computing devices in accordance with one illustrative embodiment.

FIG. 3 is an example diagram illustrating a distributed data processing system implementing a smart contract computing system, event data source/control computing system, provider computing system, and user computing devices in accordance with one illustrative embodiment. FIG. 3 shows how the various parts of the improved computing tool of the illustrative embodiments may be implemented in a distributed data processing environment, where like reference numerals represent like elements to those shown in FIGS. 1-2. It should be appreciated that each of the FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, servers 304-308 are connected to network 302. In addition, clients 310, 312, and 314 are also connected to network 302. These clients 310, 312, and 314 may be, for example, personal computers, network computers, gaming consoles, or any other computing device or data processing device usable by a user to access event data for an event. In the depicted example, servers 304-308 may provide data and/or applications to the client computing devices 310, 312, and 314. Thus, client computing devices 310, 312, and 314 may be clients to servers 304-308 in the depicted example. Distributed data processing system 300 may include additional servers, clients, and other computer network attached devices not shown, without departing from the spirit and scope of the present invention.

In the depicted example, distributed data processing system 300 may be the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, one or more of the computing devices, e.g., server 304, may be specifically configured to implement one or more computing systems present at the event venue or otherwise providing event data representing a currently occurring or previously occurred event, e.g., a broadcast or replay of a sporting event such as a football match. For example, server 304 may be configured to implement and/or interface with one or more user experience systems 160, one or more event monitoring system(s), and one or more user interrogation system(s) 320. The user experience system(s) 160 may be used to control user experience controllable devices 330, such as lighting, video devices, audio devices, etc., at the event venue. The event monitoring system(s) 170 may process data received from one or more sensors 340-344 at the event venue in order to provide event data to users and/or the smart contract computing system 200. The user device interrogation system(s)

320 provide local short range transmission mechanisms for sending interrogation signals/data messages to user devices 316-318 and to receive data back from these user devices 316-318, such as user feedback information in accordance with smart contract controlled user feedback information collection and analysis, as previously described above.

In addition, one or more of the computing devices, e.g., server 306, may be specifically configured to implement the smart contract computing system 200 previously described above with regard to FIGS. 1-2. In particular, the server 306 may implement the various components shown in FIG. 2 in order to configure the server 306 to perform their associated functions as previously described. Moreover, server 308, for example, may be configured to operate as a provider computing system 155 to which user feedback information may be provided in accordance with the illustrative embodiments, and from which provider registration information may be received as well as any user experience control information, such as particular advertising content to be pushed to users in response to detected event contexts and user feedback information patterns/user reaction data, for example.

The client computing devices 310-314 may likewise be configured to provide various systems for experiencing events and providing user feedback information to the smart contract computing system 200 for processing in a manner according to one or more of the illustrative embodiments previously described. For example, client computing device 310 may be configured to include a virtual reality and/or augmented reality (VR/AR) system 350. The VR/AR system 350 may represent the user as a virtual avatar (VA) within the system 350, where the VA represents in a virtual environment the motions, audio input, and other user feedback information in a virtual manner. The user inputs to VR/AR interface (I/F) devices 352, such as virtual reality headset movement, hand motion sensors, leg/arm motion sensor, audio pickup devices, cameras, and the like, provide data regarding the user feedback which is then rendered in the virtual environment as if the VA were providing the user feedback information input, and this user feedback information may be sent to the smart contract computing system 200 in a similar manner that the user feedback information is sent by the wearable/portable devices 316-318. Moreover, similar to the wearable/portable user devices 316-318, a smart contract agent application may be deployed to the client computing device 310 which may collect and process the user feedback information from the virtual avatar (VA) and/or user VR/AR interface devices 352.

Clients 312 and 314 are shown as being configured to provide a delayed output of the event data to a user and receiving user feedback information from user interfaces and/or sensors. In particular, client 312 is configured to provide an event data replay system 360 which can replay recorded event data at a remote time from the actual occurrence of the event. User feedback information may be gathered from the user interface and/or sensors 362 associated with the replay system 360, such as a camera or microphone for example, or these user interface and/or sensors 362 may actually be associated with a user's wearable device, such as wearable/portable devices 316-318. Similarly, client 314 is configured to provide a delayed stream system 370, such as a delayed broadcast of the event, and similar user interface and/or sensors 372 may be used to capture user feedback information.

It should be appreciated that the configuring of the computing devices shown in FIG. 3 may comprise the providing of application specific hardware, firmware, or the like to facilitate the performance of the operations and generation of the outputs described herein with regard to the illustrative embodiments. The configuring of the computing devices may also, or alternatively, comprise the providing of software applications stored in one or more storage devices and loaded into memory of the corresponding computing device for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments. It should be appreciated that once the computing device is configured in one of these ways, the computing device becomes a specialized computing device specifically configured to implement the mechanisms of the illustrative embodiments and is not a general purpose computing device.

It should also be appreciated that while FIG. 3 shows the various improved computing tool components being implemented using single server computing devices, this is only for illustration purposes. That is, each of the servers 304, 306, and 308 may in fact be implemented using a plurality of computing devices, e.g., a plurality of server computing devices, over which the various elements of the improved computing tool may be distributed. The same may be true for the client computing devices 310-314 as well, where each depiction may in fact represent a plurality of computing devices, e.g., local area networks, such as home WiFi networks, or the like, which may include multiple computing devices connected to the same local area network.

It is clear from the above, that the illustrative embodiments may be utilized in many different types of data processing environments, and specifically in a distributed data processing system environment comprising various types of computing devices interacting with one another via one or more data networks, which may include both wired and/or wireless data networks. The mechanisms of the illustrative embodiments utilize specifically configured computing devices, or data processing systems, to perform the operations for smart contract based user feedback information collection and processing from user wearable/portable devices and remotely located devices, such as via delayed or replay of event data. Moreover, the mechanisms of the illustrative embodiments utilize specifically configured computing devices to control user experiences based on user feedback information patterns and/or user reactions detected in response to detected event contexts, so as to enhance the user experience of the event. These specifically configured computing devices, or data processing systems, may comprise various hardware elements which are specifically configured, either through hardware configuration, software configuration, or a combination of hardware and software configuration, to implement one or more of the systems/subsystems described herein.

Figure 4:
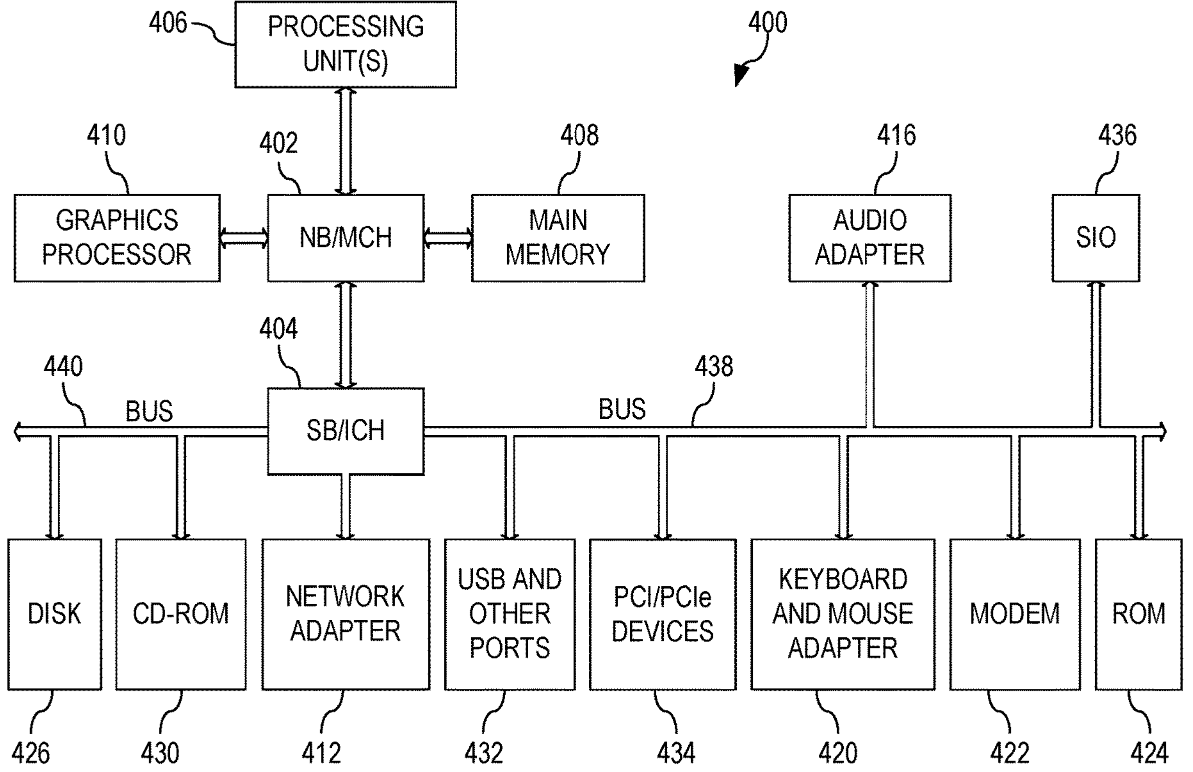
FIG. 4 is an example block diagram of a computing device in which aspects of the illustrative embodiments may be implemented.

FIG. 4 is a block diagram of just one example data processing system in which aspects of the illustrative embodiments may be implemented. Data processing system 400 is an example of a computer, such one or more of servers 304-308 in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System p® computer system, Power™ processor based computer system, or the like, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for executed by one or more hardware processors, such as processing unit 406, or the like. As such, the computing device shown in FIG. 4 becomes specifically configured to implement the mechanisms of the illustrative embodiments and specifically configured to perform the operations and generate the outputs described herein with regard to the smart contract computing system 200, the provider computing system 155, and/or the event venue computing systems, e.g., 160, 170, and the like.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
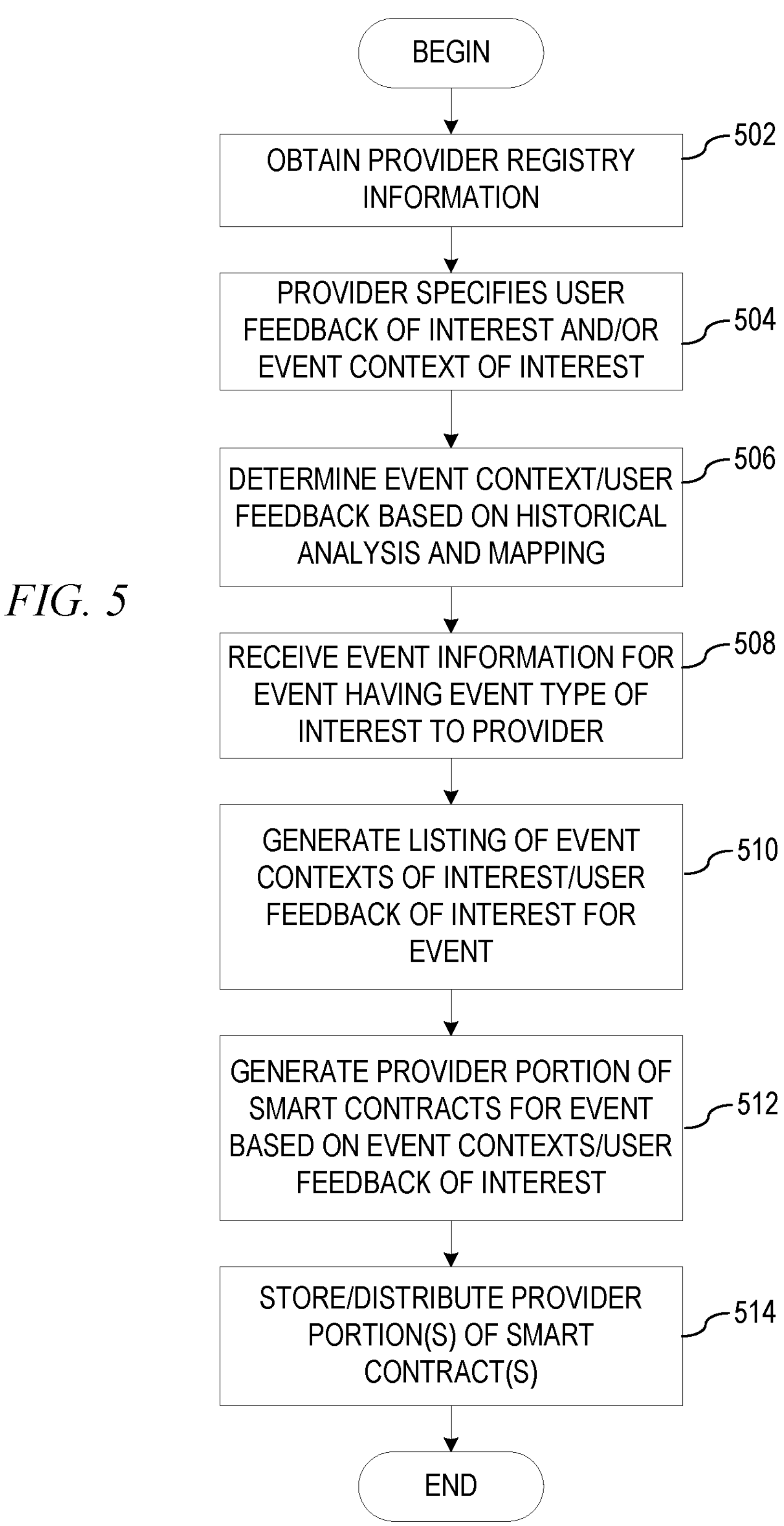
FIG. 5 is a flowchart outlining an example operation for registering a provider and generating a provider portion of a smart contract in accordance with one illustrative embodiment.

FIG. 5 is a flowchart outlining an example operation for registering a provider and generating a provider portion of a smart contract in accordance with one illustrative embodiment. The operation outlined in FIG. 5 may be implemented, for example, by the smart contract computing system 145 or 200 in FIGS. 1-3.

As shown in FIG. 5, the operation starts by obtaining provider registry information (step 502) which may include identity of the provider, user experience controls data, event identifiers (identifying specific events) or event types (specifying types of events of interest), and the like. The provider, as part of this registration process, may also specify user feedback of interest (e.g., cheering, chanting, etc.) and/or specific event contexts of interest (e.g., imminent goals in football match, goals in football match, red cards, etc.) (step 504). Optionally, event context/user feedback of interest may be determined using historical analysis of previously monitored and recorded event data so as to map the event contexts to particular user feedback information patterns and having these mappings be used to identify contexts/user feedback information patterns of interest to the provider (step 506).

Event information for the event having the event type of interest is received (step 508) and a listing is generated of event contexts of interest and user feedback of interest to the provider for the specific event (step 510). Provider portions of smart contracts for the event are then generated based on the event contexts/user feedback of interest (step 512). The provider portions of the smart contracts may then be stored for use in generating smart contract data structures at the smart contract computing system and/or distributed to user devices registered for the event for generation of smart contracts locally at the user devices via smart contract agent applications (step 514). The operation then terminates.

Figure 6:
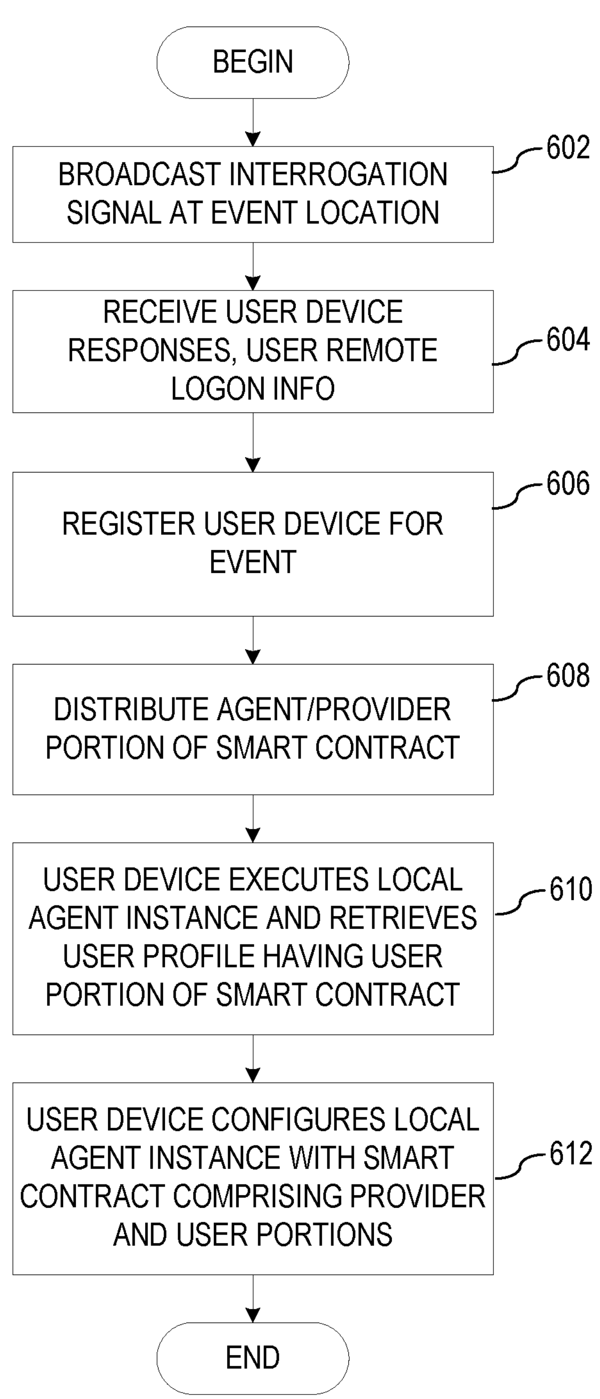
FIG. 6 is a flowchart outlining an example operation for distributing provider portions of smart contracts to user devices for generation of smart contract data structures at the user device in accordance with one illustrative embodiment.

FIG. 6 is a flowchart outlining an example operation for distributing provider portions of smart contracts to user devices for generation of smart contract data structures at the user device in accordance with one illustrative embodiment. As shown in FIG. 6, an interrogation signal/data message is broadcast local interrogation signal/data message transmission device(s), such as may be present at an event venue, for example (step 602). The user device receives the interrogation signa/data message and responds by transmitting a user device response with the identity of the user device for purposes of communication (step 604). Alternatively, if the user device is accessing the event data remotely, such as via a delayed broadcast or replay of recorded event data, the user device may be used to log onto a website or server that provides the event data to the user's device.

Based on the user device response and/or user device logon, the user device is registered for the event (step 606). For example, this may be part of a registration process where a user specifies personal information for registration, including payment information for admission costs, particular user device identifier used to access the event data, or the like. Alternatively, this may be an automated process where the user device automatically responds to an interrogation signal/data message with unique user id information, such as MAC address, IP address, user device serial number or any other unique identifier that can be used for communication purposes.

Based on the registration of the user device for the event, the smart contract agent application may be distributed, along with the one or more generated provider portions for smart contracts, to the registered user device (step 608). The user device then executes the smart contract agent application locally and retrieves a user profile having the user portion of the smart contract (step 610). The smart contract data structure(s) are then generated by combining provider portions and user portions to generate a smart contract set of rules that are then used to configure the local smart contract agent application for execution when a triggering event context is detected in event data (step 612). The operation then terminates.

Figure 7:
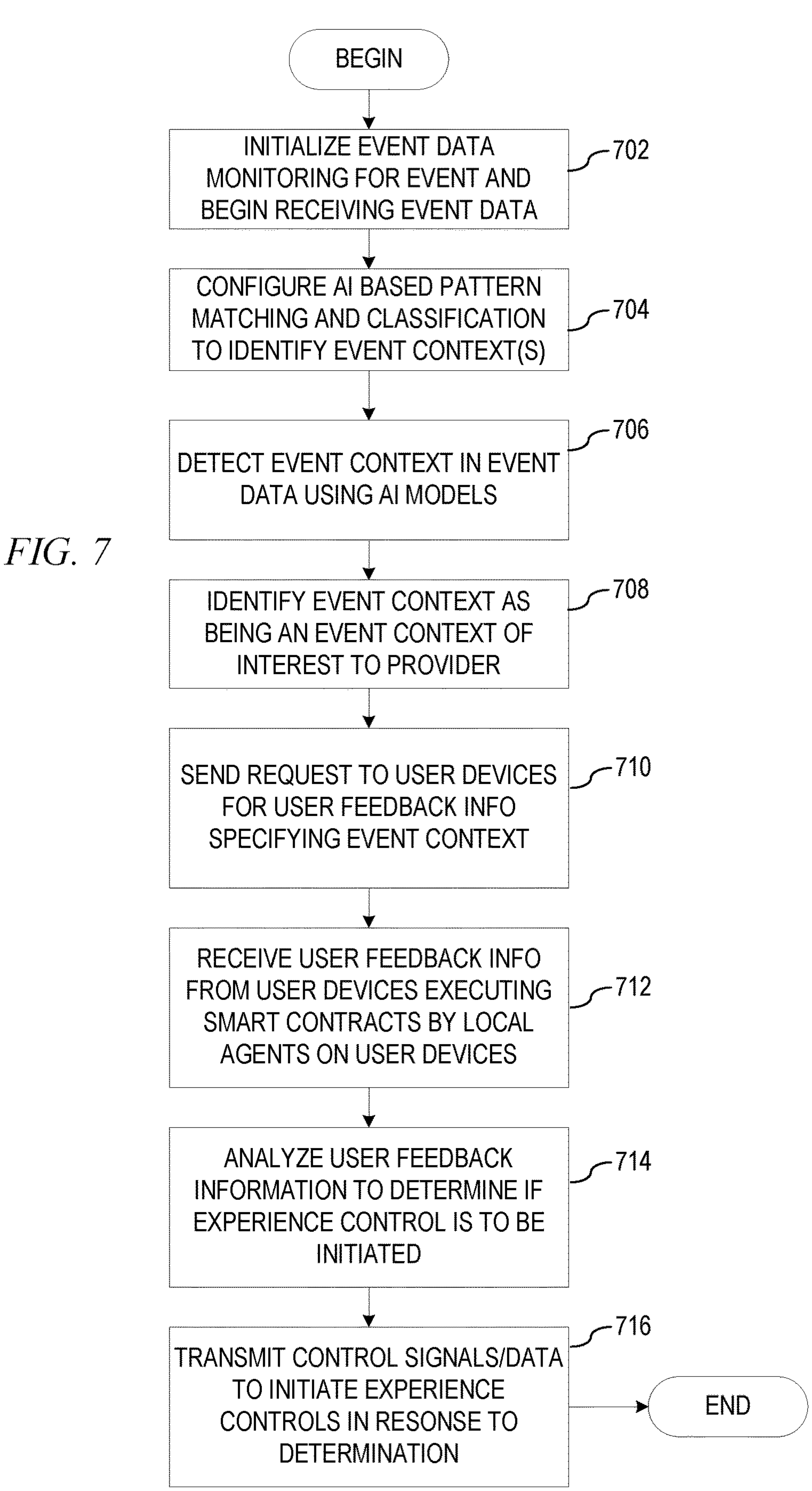
FIG. 7 is a flowchart outlining an example operation for detecting an event context in event data and triggering a smart contract based user feedback information collection based on the smart contract in accordance with one illustrative embodiment.

FIG. 7 is a flowchart outlining an example operation for detecting an event context in event data and triggering a smart contract based user feedback information collection based on the smart contract in accordance with one illustrative embodiment. The operation outlined in FIG. 7 may be performed, for example, by a smart contract computing system for detecting event contexts, receiving corresponding user feedback information, and initiating controls of user experience systems based on analysis of the user feedback information.

As shown in FIG. 7, the operation starts by initializing event data monitoring for an event and beginning the receiving of event data (step 702). The AI based pattern matching and classification computer models are configured for identifying and classifying patterns in the event data into predetermined event contexts for the event type (step 704). Based on the processing of the event data by the AI based pattern matching and classification computer models, an event context may be detected in the event data (step 706). The detected event context is then compared to event contexts of interest specified by the provider in the provider registry and/or provider portion of smart contracts, and if it matches one, then the event context is identified as one for which the provider is interested in obtaining user feedback information (step 708). In response to determining that the event context is one that the user is interested in, a request is sent to user devices for user feedback information, where the request specifies at least the detected event context (step 710). It should be appreciated that the request may specify additional parameters for collecting and analyzing user feedback information, such as time windows or time frames relative to the time stamp of the event context, for example.

The request is received at the user devices which then operate based on the execution of the established smart contracts to collect and process sensor data regarding user feedback and analyze the user feedback to identify user feedback information patterns, user reaction data, or the like (step 712). The user feedback information patterns, user reaction data, or the like, may be returned to the smart contract computing device as part of step 712 and in response to receiving the user feedback information patterns, user reaction data, or the like, the returned data is analyzed to determine if user experience controls are to be initiated (step 714). This may require looking to the provider profile or provider portion of the smart contract to determine what user experience controls to initiate to modify the user or users' experience of the event. The resulting control signals/data, if any, are then transmitted to the appropriate user experience control systems to modify the user experience of the event (step 716). The operation then terminates.

Figure 8:
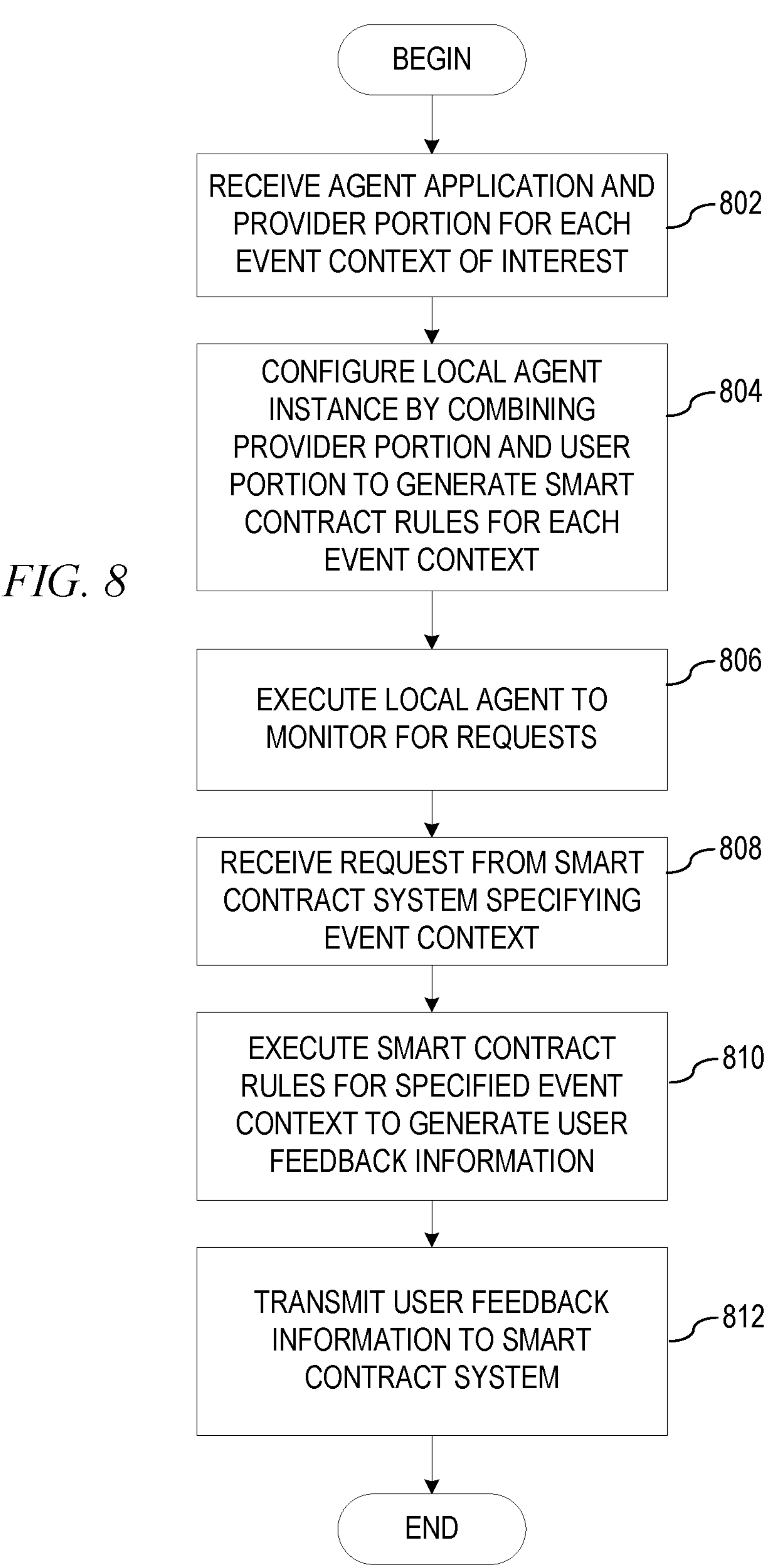
FIG. 8 is a flowchart outlining an example operation for generating a smart contract and executing the smart contract via a smart contract agent application on a user device in accordance with one illustrative embodiment.

FIG. 8 is a flowchart outlining an example operation for generating a smart contract and executing the smart contract via a smart contract agent application on a user device in accordance with one illustrative embodiment. The operation outlined in FIG. 8 may be performed at a user device, for example, in order to configure the user device to execute smart contract data structures in a smart contract agent application for communicating user feedback information back to a smart contract computing system.

As shown in FIG. 8, the operation starts by receiving a smart contract agent application and provider portion for each event context of interest (step 802). The local instance of the smart contract agent application is then configured to execute one or more smart contracts by combining the provider portion with a user portion, generated from a user profile, for each event context and thereby generate a smart contract data structure comprising one or more rules for collecting, analyzing, and reporting user feedback information back to the smart contract computing system in response to a detected event context (step 804). The configured local smart contract agent application is then executed to monitor for requests from the smart contract computing system in response to detected event contexts (step 806).

Thereafter, at some time later, the user device may receive a request from the smart contract computing system specifying an event context that was detected in event data (step 808). The smart contract rules of the smart contract data structures with which the local smart contract agent application is configured are then executed for the specified event context to thereby collect and generate user feedback information (step 810). The user feedback information is then transmitted to the smart contract system in accordance with the restrictions specified in the user portion of the smart contract data structures (step 812). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system, the computer-implemented method comprising:

generating, for at least one event context for an event, a provider portion of a smart contract data structure, wherein:

the at least one event context indicates an occurrence within the event that is detected through processing patterns of data in event data collected for the event, and the provider portion specifies a type of user feedback information that is of interest to a provider and is to be collected in response to detecting the at least one event context;

generating, for the at least one event context for the event, a user portion of the smart contract data structure, the user portion specifies a type of the user feedback information that a user of a user device permits to be shared with the provider;

generating the smart contract data structure comprising a set of smart contract rules by combining the provider portion with the user portion;

processing event data representing data collected by first sensors associated with the event to identify a pattern of data in the event data corresponding to the at least one event context;

executing the set of smart contract rules in the smart contract data structure in response to the detecting the at least one event context as a result of the processing of the event data;

collecting, in response to the detecting the at least one event context in the event data, theuser feedback information from second sensors of the user device in accordance with the set of smart contract rules, wherein:

the user feedback information is of interest to the provider as specified in the provider portion of the smart contract data structure for the detected at least one event context, and the user feedback information is permitted, by the user portion of the smart contract data structure, to be shared with the provider;

analyzing the user feedback information to identify patterns in the user feedback information indicative of one or more predefined user reactions, time stamp information associated with the at least one event context, and a physical location of the user device relative to the at least one event context at a time of occurrence of the at least one event context; and controlling, based on the analyzing of the user feedback information, at least one user experience system, by transmitting control signals from the data processing system to the user experience system, to cause the user experience system to modify an element of the event wherein;

the element of the event to modify is determined based on a retrieval of an experience control provider entry, corresponding to the provider, in a provider registry, the experience control provider entry specifies a type of experience control to perform in response to the patterns of the user feedback information, and the controlling of the at least one user experience system comprises controlling one or more of a lighting system to control a lighting characteristic of the event generated by the lighting system, an audio system to change an audio characteristic of the event generated by the audio system, a video system to change a video characteristic of one or more display devices of the event, or a special effects system to change special effects of the event generated by the special effects system.

2. The computer-implemented method of claim 1, wherein the first sensors associated with the event are selected from the group consisting of;

cameras, separate from the user device and located at a physical location of the event, providing video data as part of the event data, and audio sensors, separate from the user device and located at the physical location of the event, providing audio data as part of the event data, and the processing of the event data comprises applying at least one of image pattern recognition analysis or audio pattern analysis to identify predefined patterns in at least one of the video data or the audio data indicative of an event context in the at least one event context for the event.

3. The computer-implemented method of claim 1, further comprising deploying the smart contract data structure to an agent application executing on the user device, wherein the agent application enforces the smart contract data structure by performing the executing of the set of smart contract rules in response to a message being received, from the data processing system, and the message indicates that the at least one event context has been identified as a result of the processing of the event data.

4. The computer-implemented method of claim 1, wherein the collecting of the user feedback information further comprises:

analyzing the user feedback information, by inputting the user feedback information into one or more machine learning trained computer models;

classifying, by the one or more machine learning trained computer models, the user feedback information into a predefined classification of a plurality of predefined classifications of the user feedback information, to identify the patterns in the user feedback information indicative of the one or more predefined user reactions, wherein the predefined classification corresponds to a user reaction, of the one or more predefined user reactions, matching the type of the user feedback information that is of interest to the provider; and transmitting, based on the classifying of the user feedback information by the one or more machine learning trained computer models into the predefined classification the user feedback information to a provider computing system.

5. The computer-implemented method of claim 1, further comprising:

transmitting the collected user feedback information to a provider computing system associated with the provider in accordance with the set of smart contract rules, wherein a plurality of user devices, including the user device, transmit corresponding user feedback information to the provider computing system that aggregates the user feedback information, and the controlling of the at least one user experience system comprises:

controlling, by the provider computing system, the at least one user experience system based on the aggregated user feedback information from the plurality of user devices; and modifying the element of the event based on an analysis of the aggregated user feedback information.

6. A computer program product comprising a computer readable storage medium having a computer readable program stored therein, wherein the computer readable program, when executed in a data processing system, causes the data processing system to:

generate, for at least one event context for an event, a provider portion of a smart contract data structure, wherein:

the at least one event context indicates an occurrence within the event that is detected through processing patterns of data in event data collected for the event, and the provider portion specifies a type of user feedback information that is of interest to a provider and is to be collected in response to detecting the at least one event context;

generate, for the at least one event context for the event, a user portion of the smart contract data structure, wherein the user portion specifies a type of the user feedback information that a user of a user device permits to be shared with the provider;

generate the smart contract data structure comprising a set of smart contract rules by combining the provider portion with the user portion;

process event data representing data collected by first sensors associated with the event to identify a pattern of data in the event data corresponding to the at least one event context;

execute the set of smart contract rules in the smart contract data structure in response to the detecting the at least one event context as a result of the processing of the event data;

collect, in response to the detecting the at least one event context in the event data, the user feedback information from second sensors of the user device in accordance with the set of smart contract rules, wherein:

the user feedback information is of interest to the provider as specified in the provider portion of the smart contract data structure for the detected at least one event context, and the user feedback information is permitted, by the user portion of the smart contract data structure, to be shared with the provider;

analyze the user feedback information to identify patterns in the user feedback information indicative of one or more predefined user reactions, time stamp information associated with the at least one event context, and a physical location of the user device relative to the at least one event context at a time of occurrence of the at least one event context; and control, based on the analysis of the user feedback information, at least one user experience system, by transmitting control signals from the data processing system to the user experience system, to cause the user experience system to modify an element of the event, wherein:

the element of the event to modify is determined based on a retrieval of an experience control provider entry, corresponding to the provider, in a provider registry, the experience control provider entry specifies a type of experience control to perform in response to the patterns of the user feedback information, and the control of the at least one user experience system comprises control of one or more of a lighting system to control a lighting characteristic of the event generated by the lighting system, an audio system to change an audio characteristic of the event generated by the audio system, a video system to change a video characteristic of one or more display devices of the event, or a special effects system to change special effects of the event generated by the special effects system.

7. The computer program product of claim 6, wherein the first sensors associated with the event are selected from the group consisting of:

cameras, separate from the user device and located at a physical location of the event, providing video data as part of the event data, and audio sensors, separate from the user device and located at the physical location of the event, providing audio data as part of the event data, and the processing of the event data comprises applying at least one of image pattern recognition analysis or audio pattern analysis to identify predefined patterns in at least one of the video data or the audio data indicative of an event context in the at least one event context for the event.

8. The computer program product of claim 6, wherein the computer readable program further causes the data processing system to deploy the smart contract data structure to an agent application executing on the user device, the agent application enforces the smart contract data structure by performing the execution of the set of smart contract rules in response to a message being received, from the data processing system, and the message indicates that the at least one event context has been identified as a result of the processing of the event data.

9. The computer program product of claim 6, wherein the computer readable program further causes the data processing system to:

analyze the user feedback information, by inputting the user feedback information into one or more machine learning trained computer models;

classify, by the one or more machine learning trained computer models, the user feedback information into a predefined classification of a plurality of predefined classifications of the user feedback information, to identify the patterns in the user feedback information indicative of the one or more predefined user reactions, wherein the predefined classification corresponds to a user reaction, of the one or more predefined user reactions, matching the type of the user feedback information that is of interest to the provider; and transmit, based on the user feedback information being classified by the one or more machine learning trained computer models into the predefined classification the user feedback information to a provider computing system.

10. The computer program product of claim 6, wherein the computer readable program further causes the data processing system to:

transmit the collected user feedback information to a provider computing system associated with the provider in accordance with the set of smart contract rules, wherein a plurality of user devices, including the user device, transmit corresponding user feedback information to the provider computing system that aggregates the user feedback information, and the control of the at least one user experience system comprises:

control, by the provider computing system, the at least one user experience system based on the aggregated user feedback information from the plurality of user devices, and modify the element of the event based on an analysis of the aggregated user feedback information.

11. An apparatus, comprising:

a processor; and a memory coupled to the processor, wherein the memory comprises instructions which, when executed by the processor, cause the processor to:

generate, for at least one event context for an event, a provider portion of a smart contract data structure, wherein:

the at least one event context indicates an occurrence within the event that is detected through processing patterns of data in event data collected for the event, and the provider portion specifies a type of user feedback information that is of interest to a provider and is to be collected in response to detecting the at least one event context;

generate, for the at least one event context for the event, a user portion of the smart contract data structure, wherein the user portion specifies a type of the user feedback information that a user of a user device permits to be shared with the provider;

generate the smart contract data structure comprising a set of smart contract rules by combining the provider portion with the user portion;

process event data representing data collected by first sensors associated with the event to identify a pattern of data in the event data corresponding to the at least one event context;

execute the set of smart contract rules in the smart contract data structure in response to the detecting the at least one event context as a result of the processing of the event data;

collect, in response to the detecting the at least one event context in the event data, the user feedback information from second sensors of the user device in accordance with the set of smart contract rules, wherein:

the user feedback information is of interest to the provider as specified in the provider portion of the smart contract data structure for the detected at least one event context, and the user feedback information is permitted, by the user portion of the smart contract data structure, to be shared with the provider;

analyze the user feedback information to identify patterns in the user feedback information indicative of one or more predefined user reactions, time stamp information associated with the at least one event context, and a physical location of the user device relative to the at least one event context at a time of occurrence of the at least one event context; and control, based on the analysis of the user feedback information, at least one user experience system, by transmitting control signals from a data processing system to the user experience system, to cause the user experience system to modify an element of the event, wherein:

the element of the event to modify is determined based on a retrieval of an experience control provider entry, corresponding to the provider, in a provider registry, the experience control provider entry specifies a type of experience control to perform in response to the patterns of the user feedback information, and the control of the at least one user experience system comprises control of one or more of a lighting system to control a lighting characteristic of the event generated by the lighting system, an audio system to change an audio characteristic of the event generated by the audio system, a video system to change a video characteristic of one or more display devices of the event, or a special effects system to change special effects of the event generated by the special effects system.

12. The computer-implemented method of claim 1, further comprising distributing the provider portion to a plurality of user devices for implementation as part of the smart contract data structure in each user device of the plurality of user devices, wherein:

each user device in the plurality of user devices comprises a corresponding user portion, and each user device of the plurality of user devices generates a corresponding smart contract data structure at least by combining the corresponding user portion with the distributed provider portion, and the corresponding smart contract data structure comprises the provider portion common to the plurality of user devices, and the corresponding user portion.

13. The computer-implemented method of claim 1, wherein the type of the user feedback information that is of interest to the provider and is to be collected in response to the detecting the at least one event context is selected from the group consisting of a specific movement pattern by the user and a specific biometric pattern of the user.

14. The computer-implemented method of claim 1, further comprising generating a registry of event contexts, wherein:

each entry in the registry of event contexts comprises a mapping data structure for a corresponding event context, the mapping data structure maps the corresponding event context to at least one type of the user feedback information and a timing window that specifies a period of time relative to a time of the corresponding event context in which to collect the type of the user feedback information from the second sensors associated with the user device, and the generating of the provider portion of the smart contract data structure comprises selecting the corresponding event context from a plurality of event contexts in the registry of event contexts for inclusion of a corresponding mapping data structure in the provider portion.

15. The computer-implemented method of claim 14, wherein the collecting of the user feedback information is controlled to be performed within the timing window specified in the corresponding mapping data structure.

16. The computer-implemented method of claim 14, wherein the mapping data structure is generated based on a historical analysis of event contexts, of the plurality of event contexts, of previously occurring events and timing information specifying when different types of the user feedback information were detected based on in the event contexts.

17. The computer-implemented method of claim 1, wherein the at least one user experience system comprises the lighting system, and wherein controlling of the lighting characteristic of the event comprises controlling lights lighting the event.

18. The computer-implemented method of claim 1, wherein the at least one user experience system comprises the audio system, and wherein controlling of the audio characteristic of the event comprises controlling audio output of a recording as part of the event.

19. The computer-implemented method of claim 1, wherein the at least one user experience system comprises the video system, and wherein controlling of the video characteristic comprises controlling presentation of video content that is output on the one or more display devices of the event.

20. The computer-implemented method of claim 1, wherein the event is a virtual event, the controlling of the at least one user experience system comprises controlling modification of a virtual environment of the event via the video system at least by digitally modifying an output of the virtual environment with an overlay presented over the virtual environment of the event, wherein the overlay provides at least one of additional video content, digital special effects, or digital lighting.

* * * * *